(12) United States Patent
McKeown et al.

(10) Patent No.: US 8,494,996 B2
(45) Date of Patent: Jul. 23, 2013

(54) CREATION AND REVISION OF NETWORK OBJECT GRAPH TOPOLOGY FOR A NETWORK PERFORMANCE MANAGEMENT SYSTEM

(75) Inventors: Robert J. McKeown, Newburyport, MA (US); Michael D. Uftring, Tyngsborough, MA (US)

(73) Assignee: International Business Machines Corporation, Armonk, NY (US)

(*) Notice: Subject to any disclaimer, the term of this patent is extended or adjusted under 35 U.S.C. 154(b) by 488 days.

(21) Appl. No.: 12/821,946

(22) Filed: Jun. 23, 2010

(65) Prior Publication Data
US 2011/0320394 A1   Dec. 29, 2011

(51) Int. Cl.
*G06F 7/00*   (2006.01)
*G06F 9/44*   (2006.01)
*G06F 17/00*  (2006.01)

(52) U.S. Cl.
USPC .............................. 706/47; 717/100; 707/600

(58) Field of Classification Search
None
See application file for complete search history.

(56) References Cited

U.S. PATENT DOCUMENTS

| | | |
|---|---|---|
| 5,655,071 A | 8/1997 | Habbe et al. |
| 6,226,788 B1 * | 5/2001 | Schoening et al. ........... 717/107 |
| 6,606,613 B1 | 8/2003 | Altschuler et al. |
| 6,778,971 B1 | 8/2004 | Altschuler et al. |
| 6,788,315 B1 * | 9/2004 | Kekic et al. ................. 715/733 |

OTHER PUBLICATIONS

Gonzales et al., "Highly Dynamic Behavior Adaptability Through Prototypes with Subjective Multimethods", ACM 2007, DLS'07, Oct. 2007, Montreal Canada, pp. 77-89.
Lieberherr, "Traversals of Object Structures: Specification and Efficient Implementation", ACM Transactions on Programming Languages and Systems, vol. 26, No. 2, Mar. 2004, pp. 370-412.
Winkelholz et al., "Bridging psychophysics and cognitive engineering in visual perception", Proceedings of the IEEE International Conference on Systems, Man, and Cybernetics (SMC 2007), 7.-10., Oct. 2007,, Montreal 2007, S. 2520-2527.

* cited by examiner

*Primary Examiner* — Alan Chen
(74) *Attorney, Agent, or Firm* — Yee & Associates, P.C.; Yeen Tham

(57) ABSTRACT

An embodiment of the invention comprises, providing an initial object graph to a database, the initial object graph being generated by applying a set of rules to resources included in a resource set at a specified time, or by revising a previous object graph at the previous time, the resource set at the specified time comprising an initial resource set. The method includes providing the initial object graph to a working memory, maintained in separation from the database; discovering a changed fact associated with one of the resources of the initial resource set; and upon discovering the changed fact, determining modifications required by the changed fact to the initial object graph. If modifications are required, the initial object graph is revised in the working memory to include such modifications. The same revisions are then made to the initial object graph in the system database.

20 Claims, 6 Drawing Sheets

CREATION AND REVISION OF NETWORK OBJECT GRAPH TOPOLOGY FOR A NETWORK PERFORMANCE MANAGEMENT SYSTEM

BACKGROUND

1. Field

The invention disclosed and claimed herein generally pertains to a system and method for creating and revising a network object graph topology model, or object graph, for a network. More particularly, the invention pertains to a system and method of the above type which is generally applicable in any domain wherein entities of the network are modeled as resources that have attributes and there is a desire to arrange the resources into an object graph. Embodiments of the invention could be used with network performance management systems and social media applications, as representative examples, but the invention is not limited thereto.

2. Description of the Related Art

Network performance management involves measuring, modeling, planning and optimizing networks. This is done to ensure that a managed network carries traffic with a speed, reliability, and capacity that is appropriate for a particular network application, and is also appropriate for the cost constraints of an associated organization. In order to perform these functions effectively for a given network, a performance management system must first collect data from many different sources in the network, and then generate statistics from the data and use the data to produce reports. These activities, which may be referred to as analytic processing, provide results which include basic summary statistics such as aggregations. Results may also include Busy Hour data, which indicates when network components experience their heaviest traffic loads.

Before a performance management system can collect or gather data of the above type, it must first discover the devices or resources that are included in the given network. Resources are exemplified by devices such as web servers, application servers, and routers, but are not limited thereto. In one approach, a performance management system uses available heuristics and algorithms to scan the network, in order to detect the respective devices contained therein. Alternatively, the system may initially be provided with a set of data that shows all the resources included in the network.

After all network resources have been discovered or determined, the performance management system typically applies an organizational mechanism to the resources, to arrange the resources into a data structure on the basis of specified groupings related to an intended purpose or objective. Common examples would be to arrange the resources based on their respective geographic locations, or on customer relationships. Usefully, the organizational mechanism comprises a set of organizational or grouping rules, which provide relationships or contexts for arranging respective resources. By applying the set of rules to the set of discovered resources, the management system generates a structure comprising an object model or object graph, wherein network resource instances are nodes on the graph, and relationship instances are arcs or edges on the graph. The object graph may comprise a tree structure, but is not limited thereto. The constructed object graph is then used by the management system for subsequent analytic processing of the given network.

In arrangements of the above type, changes are expected to occur to resources over a period of time. Accordingly, the object graph must be repeatedly updated to accord with such changes. However, present methods for updating an object graph generally use the same type of batch-oriented technique that is used to create or generate the object graph initially for a particular network. In such technique, resources are first placed into a performance management system database. In one exemplary system, known as Tivoli Network Performance Management (TNPM), the rules are transformed into SQL queries. Other systems may use the rules in other ways to provide the queries. The queries are then executed against the global set of resources and existing resource/groups, to determine what resources and relationships should be created or deleted. Thereafter, in order to update the object graph for the particular network, this same batch technique is carried out periodically, at prespecified intervals that are based on the needs or characteristics of the particular network. Thus, the updating batch procedure could, as examples, be run on the network every hour, every six hours, or on a daily or weekly basis. More generally, the objective is to track the network changes closely. If the network changes frequently (which is very common), then a large number of object graph updates will ensue.

A significant drawback of such currently used updating procedure is that the computational effort required to update an object graph can be grossly disproportional to the amount of network change which has actually occurred. For example, a network containing on the order of $10^6$ resource devices could have experienced change to only one or a few of the devices since the last update procedure. Moreover, use of a batch procedure places a very uneven load on the associated system, particularly for large networks. For example, every resource of the network may be affected, each time the updating batch procedure is run.

SUMMARY

Embodiments of the invention can be a method, an apparatus and or a computer program product. Each embodiment is associated with a network that has a resource set comprising multiple resources. A set of rules is applied to arrange respective resources of the network into a structure comprising an object graph, and changes are disposed to occur over time to one or more resources of the resource set. An embodiment directed to a method comprises the step of providing an initial object graph to a system database, wherein the initial object graph is either generated by applying the set of rules to respective resources included in the resource set at a specified time, or else is provided at a specified time by revising a previous object graph, selectively, the resource set at the specified time comprising an initial resource set. The method further comprises providing a working memory with a copy of the initial object graph, wherein the working memory is maintained in separation from the system database; discovering a changed fact associated with one of the resources of the initial resource set; and responsive to discovering the changed fact, determining one or more modifications that are required by the changed fact to be made to the initial object graph. Responsive to determining the one or more modifications required by the changed fact, revising the initial object graph in the working memory to produce a revised object graph that includes each of the required modifications. Responsive to the revision of the initial object graph in the working memory, the same revisions are made to the initial object graph in the system database, in order to provide the revised object graph therein.

DETAILED DESCRIPTION

Figure 1:
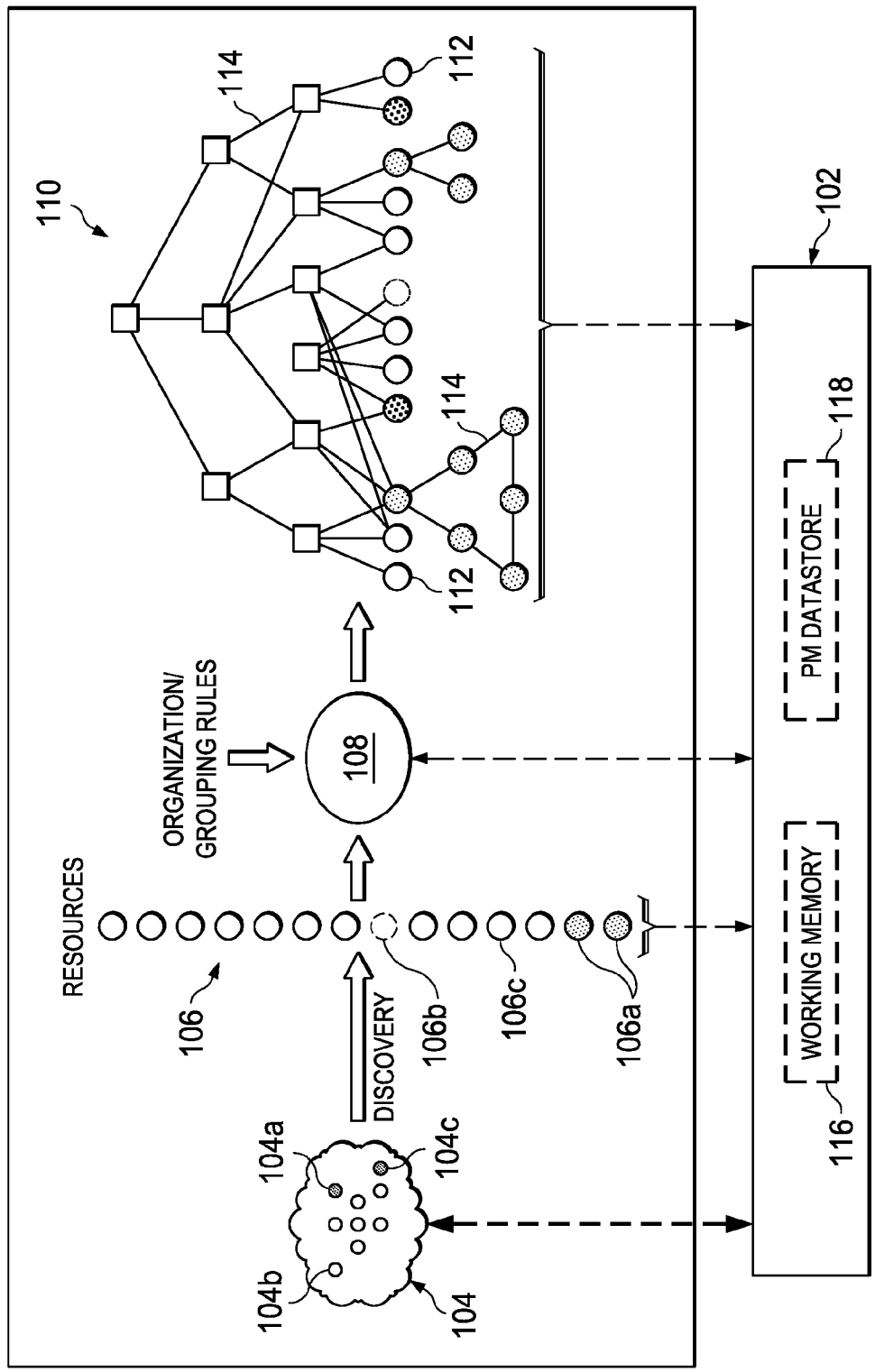
FIG. 1 is a schematic diagram showing aspects of a process relating to the updating of an object graph, which may be updated in accordance with embodiments of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a network performance management system 102, comprising a computer or data processing system, which is connected to a network 104. System 102 comprises a number of components which are well known those of skill in the art. However, only a working memory 116 and database 118 are specifically shown in FIG. 1. These components are described hereinafter in further detail. Network 104 comprises a number of devices and other entities, which collectively comprise resources as exemplified by resources 104a-c. These resources can include, by way of example and not limitation, web servers, application servers, transaction processors, routers, printers, and print queues. The size or scale of network 104 can be selected from a very wide range, extending from a local office network that has only a few devices, to a national or global network that exceeds on the order of $10^5$ or $10^6$ devices, or more. System 102 is configured to carry out performance management activities, of the types described above, for network 104. Accordingly, it is necessary for management system 102 to initially discover each of the resources of network 104, and to construct an object graph therefrom.

Usefully, system 102 is operated at a specified startup time to implement a conventional discovery procedure, in order to discover or determine all the resources which are included in network 104 at the specified time. Alternatively, the discovery process may be configured to select only a particular subset of the total resources which could be discovered. The discovered resources are collectively depicted in FIG. 1 as resource set 106. System 102 then applies a set of organization/grouping rules 108 to the discovered resources. The resources, or objects, are thereby arranged or organized into an object graph 110. In object graph 110, network resources are shown as network nodes 112 on the graph, and relationships established by the rules are the arcs or edges 114 for the graph, which extend between respective nodes. The resources or objects are usefully modeled as artifacts with sets of attributes, e.g. name/value pairs, and the rules are usefully expressed as a set of partial SQL constructs, as is done currently by the TNPM system. The object graph 110 is stored in a performance management (PM) datastore 118 of system 102, and provides a context for subsequent analytic processing of the network 104.

FIG. 1 also shows performance management system 102 provided with a working memory 116, described hereinafter in further detail. The working memory 116 is thus seen to be separated from PM datastore 118, and such separation is maintained.

After the specified startup time when the object graph 110 is initially generated, the performance management system 102 must carry out procedures to update the object graph, as subsequent changes occur to the network resources and are discovered by system 102. For example, FIG. 1 shows resources 106a, which have been added to network 104 after the specified time. FIG. 1 further shows a resource 106b which has been deleted, and a resource 106c which has been modified, likewise since the specified time. The object graph may need to be revised or updated in view of all of these changes.

In providing embodiments of the invention, an important objective is to achieve reasonable equivalence or compatibility between the magnitude of a given change that has occurred to network resources, and the amount of computational or processing effort which must be expended to update the object graph, in view of the given change. Thus, a change that affects only one resource out of $10^6$ resources of a network will require only a small effort to update the corresponding object graph. By using incremental updates of this type, embodiments of the invention are also able to reduce latency, that is, the period which elapses between discovery by the system of a network resource change, and the time when the object graph is updated or revised to reflect the change. More particularly, latency is reduced because it is not necessary to wait for the next periodic update operation to occur, which is required by a batch updating process.

A further benefit that is provided by embodiments of the invention is improved load distribution. This is achieved by avoiding the previously used batch procedure, wherein updates occur only at prespecified times, and may involve all resources of the network. In the disclosed embodiments, activity to update the object graph can be more distributed over time, and occurs shortly after each change occurs.

In order to realize these benefits, embodiments of the invention make use of a currently available forward reasoning or forward chaining process, implemented by a forward chaining rules engine. In a process of this type, a set of rules is applied to an initial fact, to generate an inference or conclusion. The conclusion may produce a new fact, and the rules are then applied to that fact. Thus, forward chaining generally uses facts or data, together with inference rules, to extract or develop further facts or data.

In embodiments of the invention, an initial fact usefully comprises a change in regard to a network resource which has just been discovered by system 102. The change can be an addition, deletion or modification of a resource. Rules from the set of rules 108, which are also referred to as production rules or productions, are then applied to the resource change. In rules engine terminology, a change to a resource is a change to a set of facts that reside in the working memory 118. Such a change to a fact triggers the rules engine to apply the rules, and derive inferences. These rules provide inferences in regard to the existence of relationships between nodes of the object graph, which represent network resources as described above. Moreover, if the inferences result in a new fact or conclusion, the rules are applied to the new fact, to determine whether they "fire" from the new fact, that is, act to provide further inferences that may lead to yet another fact or facts. This process continues until no more facts, i.e. changes to network resources, are generated. Revisions to object graph 110, as required by the respective discovered changes, are then made.

Figure 2:
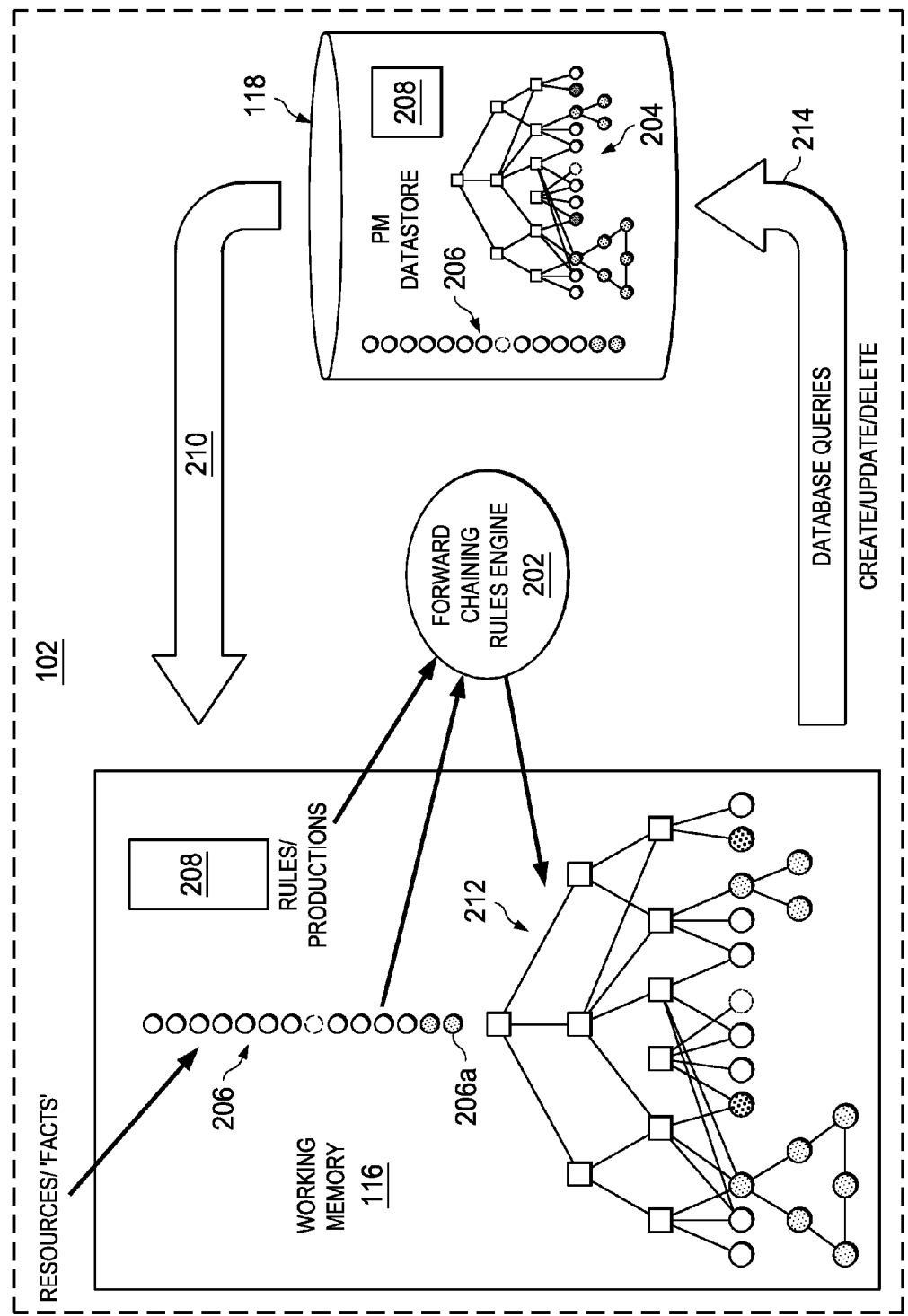
FIG. 2 is a schematic diagram illustrating respective components for an embodiment of the invention.

Referring to FIG. 2, there is shown performance management system 102 provided with components for carrying out the forward chaining process described above. One of such components comprises a forward chaining rules engine 202, described hereinafter in further detail, which is interconnected to working memory 116. Working memory 116 thus serves as the memory for engine 202. FIG. 2 further shows performance management datastore 118 containing a set of resources 206 that were discovered from network 104, and also containing a set of rules 208. Resources 206 and rules 208 are similar or identical to resources 106 and rules 108 of FIG. 1, respectively. An object graph 204 contained in PM database 118, which may be similar or identical to object graph 110, is the object graph for the resources 206 and rules 208 at a specified time, as further described hereinafter.

Referring further to FIG. 2, there is shown a mechanism 210 that is operable to transfer the resources 206 to working memory 116 as facts, and to transfer the rules 208 to working memory 116 as production rules, or productions. Mechanism 210 is further operable to update the resources/facts 206 in working memory 116, each time changes occur thereto. An object graph 212 is contained in working memory 116, which is derived from the resources/facts 206 and the rules/productions 208. Mechanism 210, is thus the component that makes changes to resources of set 206 in working memory 116, which is a reflection/copy of the resource set in PM database 118. The changes made to resource set 206 in the working memory typically trigger execution of rules engine 202. Rules or productions 208 are also routed to the engine 202.

In one illustrative mode of operation, it is assumed that just prior to a specified time, there have been no recent changes to any of the resources 206. Accordingly, object graph 212 of working memory 116 will be identical to object graph 204 of datastore 118 at the specified time. Then, after the specified time, a change is detected to the resources 206, for example, the addition of a new resource 206a. This change or fact triggers execution of forward chaining rules engine 202. Engine 202 then applies rules 208 to the fact, in order to generate inferences regarding any modifications that are needed to object graph 212 in view of the fact. Modifications could include creating, deleting or modifying one or more nodes or edges of the graph 212. After engine 202 has reached a conclusion as to modifications that are needed, the modifications are made immediately to object graph 212, as a result of the detected change or fact, such as the addition of new resources 206a, e.g., within a time that can be less than one second. Moreover, the only modifications made to the object graph are those which are specifically required by the detected change or fact. Thus, the object graph is updated incrementally.

FIG. 2 further shows a mechanism 214 that is operable to transfer the required modifications to PM datastore 118, immediately after the modifications are made to object graph 212. Usefully, this is done by executing SQL queries on the datastore. The modifications are then immediately incorporated into object graph 208, so that object graph 204 in PM datastore 118 is identical to, or is synchronized with, object graph 212 of working memory 116. It is anticipated that for some embodiments the above process, from discovery of the resource change by mechanism 210 until the modifications required for the change have been made to the object graph in datastore 118, can be completed in less than 2 or 3 seconds for a small network. It is further anticipated that the above process may be completed in less than 5 or 6 minutes for a large network, such as a network that has on the order of $10^6$ devices. However, embodiments of the invention are not limited to such times. Thus, the object graph 204 in PM datastore 118 can be readily updated on an incremental basis, in response to a particular resource change, and latency time can be very small.

In a useful embodiment of the invention, forward chaining rules engine 202 is configured to implement the RETE algorithm, in order to derive inferences by applying the rules 208 to respective facts. The RETE algorithm is an efficient pattern matching algorithm for implementing production rule systems. However, embodiments of the invention are not limited thereto.

Figure 3:
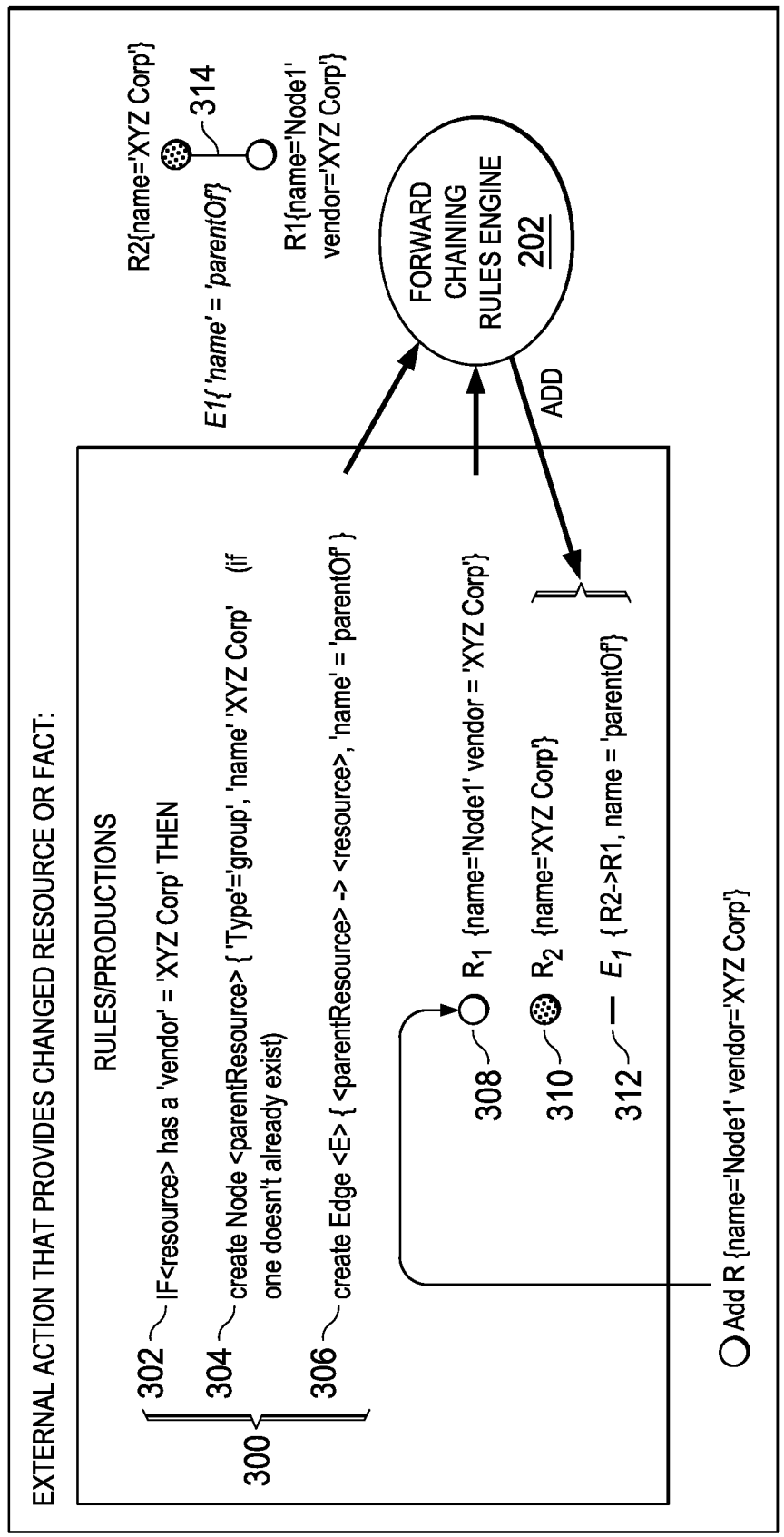
FIGS. 3 and 4 are schematic diagrams that respectively illustrate use of an embodiment of the invention to update an object graph or object model.
Figure 4:
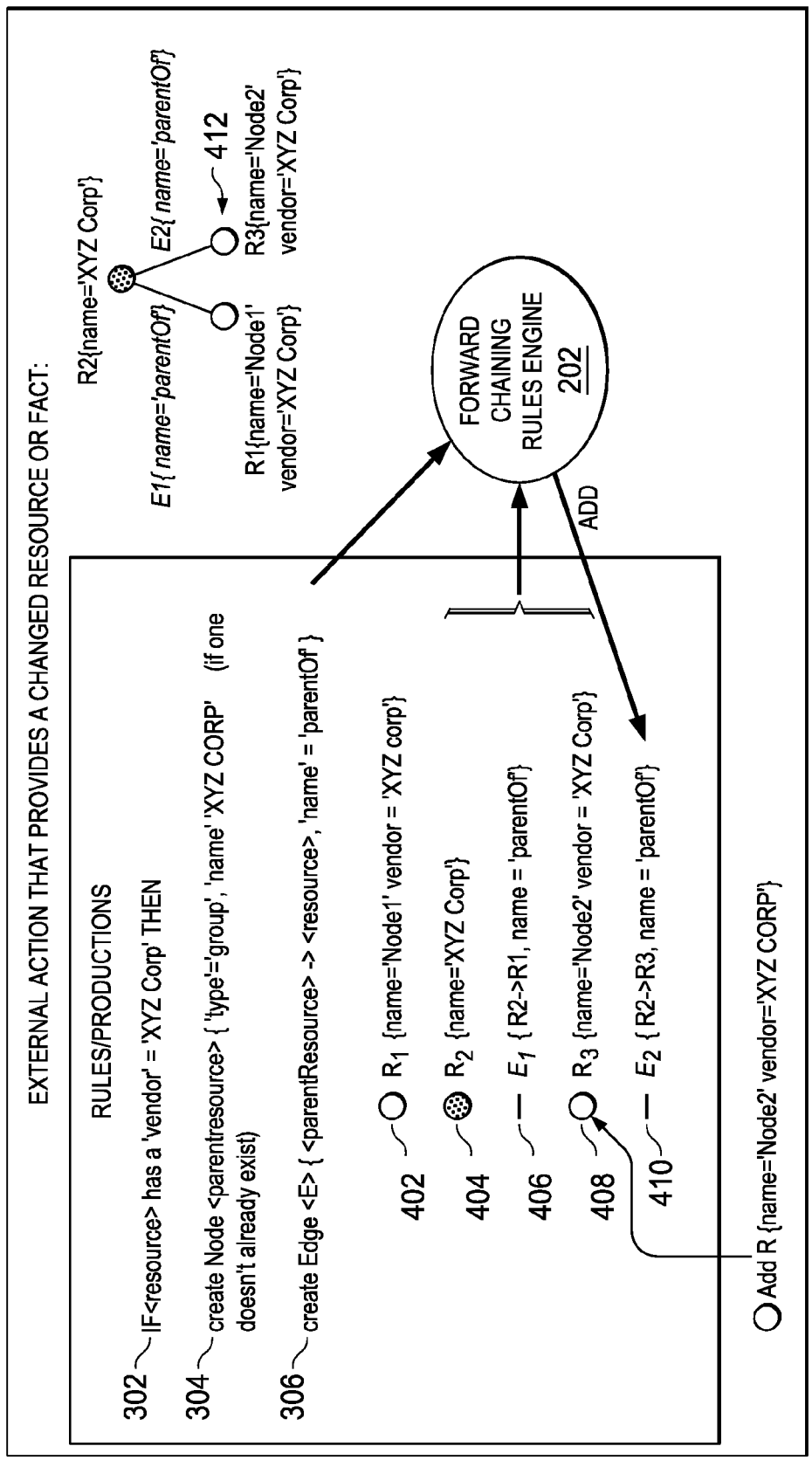

FIGS. 3 and 4 respectively illustrate simplified examples of the operation of engine 202 to apply rules 208 to facts which comprise changes to the set of resources 206. These figures further illustrate inferences that engine 202 makes in regard to modifications needed to the object graph, as a result of the resource changes.

Referring to FIG. 3, there is shown an external action taken in regard to network 104, which causes a change or changed fact in regard to a resource 206. More particularly, the change comprises adding a resource that has the name 'Node 1' and the value or attribute that vendor='XYZ Corp'. Thus, the vendor for the resource of Node 1 is identified to be XYZ Corp. In response to this action, line 308 of FIG. 3 shows that the added resource information is represented by a node R1, and this information is delivered to forward chaining rules engine 202.

Responsive to receiving the new resource information, engine 202 searches the rules 208 of working memory 116, in order to find a rule or rules that matches or pertains to the new resource or fact. As a result of the search, engine 202 locates rule 300, which states a condition 302 that if met, will infer the actions 304 and 306. The condition 302 is that a resource has a vendor XYZ Corp. If so, then action 304 requires that a parent node having the name 'XYZ Corp' must be created for the new resource, unless such parent node already exists in the object graph. Action 306 requires an edge to be created from the parent node 'XYZ Corp' to the new resource node R1.

Referring further to FIG. 3, there is shown condition 302 and actions 304 and 306 being furnished to forward chaining rules engine 202. Engine 202 implements action 304 by providing a parent node R2 that has the name 'XYZ Corp'. This is shown at line 310. Engine 202 similarly implements action 306, by providing an edge E1 that extends from node R2 to node R1, and has the name 'parentOf'. This is shown at line 312.

FIG. 3 further shows a modification 314, which comprises a revision that is to be made to object graph 212 by engine 202, as a result of the resource change shown by FIG. 3. Modification 314 comprises nodes R2 and R1, and edge E1 extending between them. This modification will also be made to object graph 204 of PM datastore 118, as described above.

Referring to FIG. 4, there is shown a further external action taken in regard to network 104, which causes a change or changed fact in regard to a resource 206 in like manner with the change shown in FIG. 3. However, it is assumed that the change of FIG. 4 occurs after all the events described in connection with FIG. 3 have been completed. In FIG. 4, the change is to add a resource that has the name 'Node 2' and the attribute that vendor='XYZ Corp'. The resource of Node 2 therefore has the same vendor as the resource of Node 1. In response to the action of FIG. 4, line 408 shows that the added resource information is represented by a node R3, and such information is delivered to forward chaining rules engine 202.

Responsive to receiving the new resource or fact of FIG. 4, engine 202 searches the rules of working memory 116 for a rule that matches this new fact. As a result of the search, engine 202 locates rule 300, the same rule found for the action of FIG. 3, together with its actions 304 and 306. FIG. 4 shows that this rule and its inferred actions are furnished to engine 202 for implementation. However, in regard to the action 304 for the new resource of FIG. 4, a parent node having the name 'XYZ Corp' already exists as node R1. Accordingly, in this case rule 300 only requires the implementation of action 306. This is done by providing an edge E2, which extends from node R2 to node R3, and has the name 'parent of'. This is shown at line 410.

Referring further to FIG. 4, there is shown a modification 412, which is to be made to object graph 212 by engine 202, as a result of the resource change shown by FIG. 4. Modification 412 is constructed from node R3 and edge E2, together with the information of lines 402-406 which is furnished to engine 202. This information respectively comprises nodes R1 and R2 and the edge E1.

Referring again to the example of FIG. 3, it is to be appreciated that the parent node R2 and also the edge E1 exists or is justified only because of the existence of the fact R1, combined with rule 302. The fact R2 specified that a resource had XYZ Corp as a vendor. However, if this fact was changed, so that no resource had a vendor XYZ Corp, or if rule 300 was changed or deleted, the justification for parent node R1 and edge E1 would be gone.

Embodiments of the invention have recognized that if the above situation occurs, it would be desirable to delete or eliminate R2 and E1 from the object graph and from any related database. This would reduce the work of engine 202, by reducing the elements that must be considered whenever the engine applies a set of rules to respective facts or resources. In a useful embodiment, a truth maintenance mechanism is used by the engine to identify and eliminate previously created resources and rules that have lost justification for their existence, as described above. Such eliminations act to decrease the amount of subsequent processing effort that is required by the engine. A truth maintenance mechanism is a feature currently used by Rules Engines to reduce the search effort required of the Rules Engine, by accurately keeping track of what inferences depend on what facts to be maintained. Therefore, when a fact (e.g. R2 has a vendor XYZ Corp) is changed, the truth maintenance mechanism knows the minimum set of inferences that it needs to revisit. This can dramatically improve performance.

Figure 5:
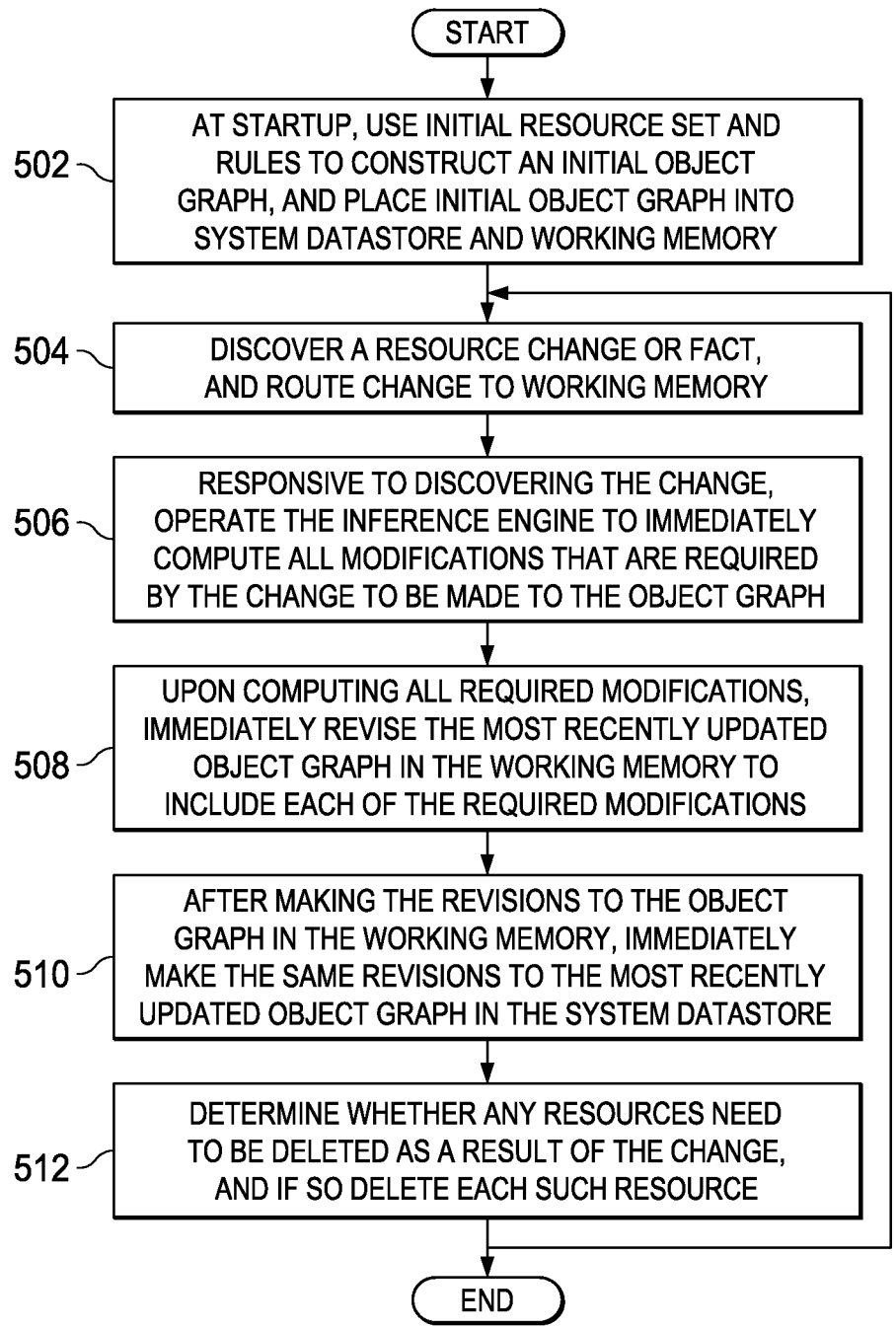
FIG. 5 is a flowchart showing steps for a method comprising an embodiment of the invention.

Referring to FIG. 5, there are shown steps for a method comprising an embodiment of the invention. Step 502 pertains to initial start up of the system, such as network performance management system 102. At step 502, the initial resource set and rules are used to construct an initial object graph, which is then placed into both the system datastore and the working memory. This step can generally be performed using the same mechanism that is used to make subsequent incremental updates, as described hereinafter. However, for step 502 such mechanism is simply operated in a bulk/batch mode, considering all currently known resources. At step 504, a resource change or fact is discovered, and is routed to the working memory.

At step 506, in response to discovering the change, an inference engine such as engine 202 is operated to immediately compute or determine all modifications which are required to be made to the object graph, as a result of the change. The term "immediately" is used herein to mean that the total time period, from the discovery of the change until all modifications are computed or determined, may be less than 1-2 seconds for a small network and does not exceed 1-2 minutes for a large network.

At step 508, upon computing or determining all required modifications, the most recently updated object graph in the working memory is immediately revised. The revision produces a revised object graph that includes each of the required modifications. The most recently updated object graph could either be the initial object graph, or a subsequently revised object graph. In a useful embodiment, the term "immediately" in connection with step 508, means that the total time period, from the time that all required modifications are determined until the object graph in the working memory is revised, may be less than 1-2 seconds for a small network and does not exceed 1-2 minutes for a large network.

At step 510, the same revisions made to the most recently updated object graph in the working memory are immediately made to the most recently updated object graph in the datastore. In one embodiment, "immediately" in step 510 means that the total time period, from the revision of the object graph in the working memory until revision of the object graph in the system datastore, may be less than 1-2 second for a small network and does not exceed 1-2 minutes for a large network. Accordingly, the total time to carry out steps 504-510 of FIG. 5, from discovery of a resource change until revision of the datastore object graph should not exceed 5-6 minutes, even if the network was a large network comprising on the order of $10^5$ or $10^6$ devices.

In another embodiment, "immediately" in regard to step 510 would mean that the revisions were made within a pre-specified time window, such as a window comprising a specified number of minutes. In this embodiment, if multiple, changes occurred that each resulted in modifications to the object graph during the period of the window, all of such modifications would be sent as a batch, to revise the object graph in the system datastore. This practice could significantly enhance efficiency.

At step 512, it is determined whether any resources need to be deleted as a result of the change. If so, each of such resources is deleted. Thereafter, the method of FIG. 5 either ends, or else returns to the input of step 504.

Figure 6:
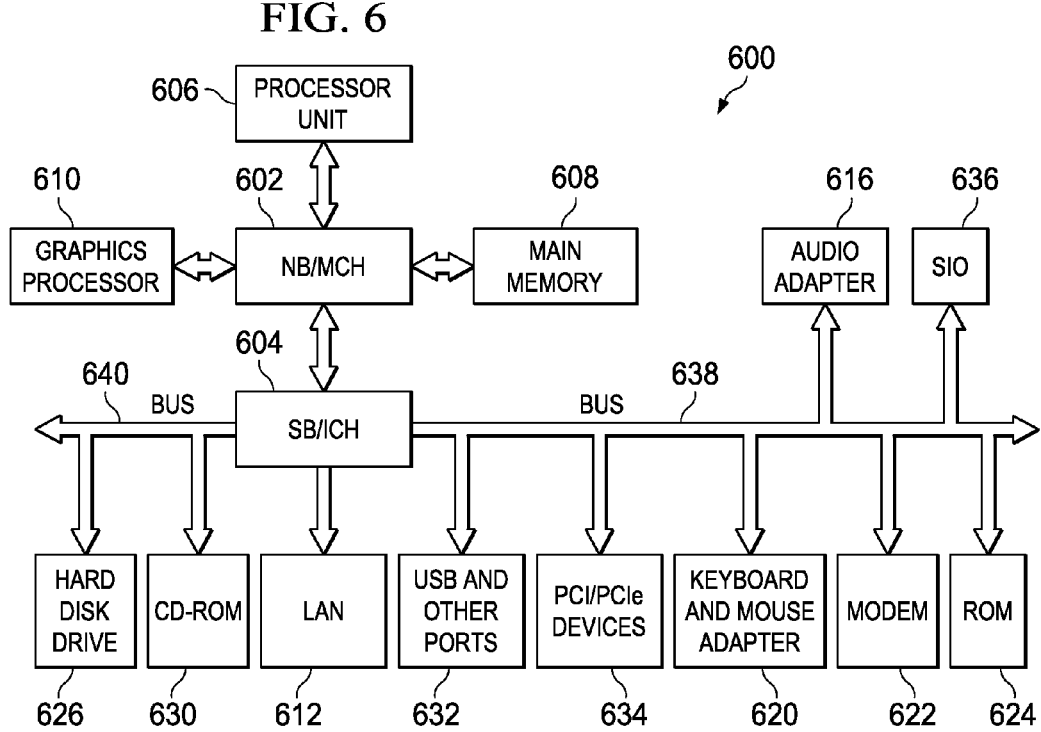
FIG. 6 is a block diagram showing a computer or data processing system that may be used in implementing embodiments of the invention.

Referring to FIG. 6, there is shown a data processing system 600 that may be used in implementing embodiments of the invention. Data processing system 600 may comprise some or all the components of performance management system 102, including working memory 116, PM datastore 118, forward chaining rules engine 202 and discovery mechanism 210. Data processing system 600 is an example of a computer, in which computer usable code or instructions implementing the processes for embodiments of the present invention may be located.

Data processing system 600 employs a hub architecture including north bridge and memory controller hub (MCH) 602 and south bridge and input/output (I/O) controller hub (ICH) 604. Processing unit 606, main memory 608, and graphics processor 610 are connected to north bridge and memory controller hub 602. Graphics processor 610 may be connected to north bridge and memory controller hub 602 through an accelerated graphics port (AGP).

In data processing system 600, local area network (LAN) adapter 612 connects to south bridge and I/O controller hub 604. Audio adapter 616, keyboard and mouse adapter 620, modem 622, read only memory (ROM) 624, hard disk drive (HDD) 626, CD-ROM drive 630, universal serial bus (USB) ports and other communications ports 632, and PCI/PCIe devices 634 connect to south bridge and I/O controller hub 604 through bus 638 and bus 640. PCI/PCIe devices may include, for example, Ethernet adapters, add-in cards and PC cards for notebook computers. PCI uses a card bus controller, while PCIe does not. ROM 624 may be, for example, a flash binary input/output system (BIOS).

Hard disk drive 626 and CD-ROM drive 630 connect to south bridge and I/O controller hub 604 through bus 640. Hard disk drive 626 and CD-ROM drive 630 may use, for example, an integrated drive electronics (IDE) or serial advanced technology attachment (SATA) interface. Super I/O (SIO) device 236 may be connected to south bridge and I/O controller hub 604.

An operating system runs on processing unit 606 and coordinates and provides control of various components within data processing system 600 in FIG. 6. An object-oriented programming system, such as the Java™ programming system, may run in conjunction with the operating system and provides calls to the operating system from Java programs or applications executing on data processing system 600 (Java is a trademark of Sun Microsystems, Inc. in the United States, other countries, or both). Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as hard disk drive 626, and may be loaded into main memory 608 for execution by processing unit 606. The processes for embodiments of the present invention are performed by processing unit 606 using computer usable program code, which may be located in a memory such as, for example, main memory 608, read only memory 624, or in one or more peripheral devices 626 and 630.

A bus system may be comprised of one or more buses, such as bus 638 or bus 640 as shown in FIG. 6. Of course the bus system may be implemented using any type of communications fabric or architecture that provides for a transfer of data between different components or devices attached to the fabric or architecture. A communications unit may include one or more devices used to transmit and receive data, such as modem 622 or network adapter 612 of FIG. 6. A memory may be, for example, main memory 608, read only memory 624, or a cache such as found in north bridge and memory controller hub 602 in FIG. 6. Examples depicted by FIGS. 1 and 2 and any other examples described herein are not meant to imply architectural limitations. For example, data processing system 600 also may be a tablet computer, laptop computer, or telephone device in addition to taking the form of a PDA.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a network that has a resource set comprising multiple resources, wherein a set of rules is applied to arrange respective resources into a structure comprising an object graph, and changes are disposed to occur over time to one or more resources of the resource set, a method comprising the steps of:

providing an initial object graph to a system database, wherein the initial object graph is either generated by applying the set of rules to respective resources included in the resource set at a specified time, or else is provided at a specified time by revising a previous object graph, selectively, the resource set at the specified time comprising an initial resource set;

providing a working memory with a copy of the initial object graph, wherein the working memory is maintained in separation from the system database;

discovering a changed fact that is associated with one of the resources of the initial resource set;

responsive to discovering the changed fact, determining one or more modifications that are required by the changed fact to be made to the initial object graph;

responsive to determining the one or more modifications required by the changed fact, revising the initial object graph in the working memory to produce a revised object graph that includes each of the required modifications; and responsive to said revision of the initial object graph in the working memory, making the same revision to the initial object graph in the system database, to provide the revised object graph therein.

2. The method of claim 1, wherein:

said required modifications are the only revisions made to the initial object graph in order to produce the revised object graph, and the revised object graph is otherwise the same as the initial object graph.

3. The method of claim 1, wherein:
the time between said step of discovering a changed fact and making said revision to the initial object graph in the system database is no greater than a prespecified time period.

4. The method of claim 1, wherein:
said one or more modifications are determined from inferences which are made by applying one or more rules from the set of rules to the changed fact.

5. The method of claim 4, wherein:
said inferences result in one or more new facts, and one or more rules from the set of rules are applied to the one or more new facts to determine said one or more modifications.

6. The method of claim 4, wherein:
said inferences are made by operation of a forward chaining rules engine.

7. The method of claim 6, wherein:
said engine is provided with a truth maintenance mechanism that keeps track of inferences and facts that respectively correspond to the inferences, and is operable when a fact is changed to determine the minimum set of inferences that must be revisited.

8. The method of claim 1, wherein:
said method includes the step of determining at specified intervals whether any of said resources has become unnecessary for an object graph, and any resource determined to be unnecessary is deleted from the resource set or the set or rules, respectively.

9. The method of claim 3, wherein:
said prespecified time period is no greater than 5 minutes.

10. The method of claim 1, wherein:
a revision to an object graph in the system database comprises one or more modifications resulting from each of two or more different changed facts, wherein each of the two or more changed facts were discovered during the same prespecified time window.

11. In association with a network that has a resource set comprising multiple resources, wherein a set of rules is applied to arrange respective resources into a structure comprising an object graph, and changes are disposed to occur over time to one or more resources of the resource set, a computer program product comprising executable instructions stored in a non-transitory computer readable storage medium, the executable instructions comprising:
instructions for providing an initial object graph to a system database, wherein the initial object graph is either generated by applying the set of rules to respective resources included in the resource set at a specified time, or else is provided at a specified time by revising a previous object graph, selectively, the resource set at the specified time comprising an initial resource set;
instructions for providing a working memory with a copy of the initial object graph, wherein the working memory is maintained in separation from the system database;
instructions for discovering a changed fact that is associated with one of the resources of the initial resource set;
instructions responsive to discovering the changed fact, for determining one or more modifications that are required by the changed fact to be made to the initial object graph;
instructions responsive to determining the one or more modifications required by the changed fact, for revising the initial object graph in the working memory to produce a revised object graph that includes each of the required modifications; and
instructions responsive to said revision of the initial object graph in the working memory, for making the same revision to the initial object graph in the system database, to provide the revised object graph therein.

12. The computer program product of claim 11, wherein:
the instructions are stored on the non-transitory computer readable storage medium in a data processing system, and the program code is downloaded over a network from a remote data processing system to the data processing system.

13. The computer program product of claim 11, wherein:
the instructions are stored on the non-transitory computer readable storage medium in a server data processing system, and the instructions are downloaded over a network to a remote data processing system for use in a second non-transitory computer readable storage medium with the remote data processing system.

14. The computer program product of claim 11, wherein:
said required modifications are the only revisions made to the initial object graph in order to produce the revised object graph, and the revised object graph is otherwise the same as the initial object graph.

15. The computer program product of claim 11, wherein:
said one or more modifications are determined from inferences which are made by applying one or more rules from the set of rules to the changed fact.

16. The computer program product of claim 15, wherein:
said inferences result in one or more new facts, and one or more rules from the set of rules are applied to the one or more new facts to determine said one or more modifications.

17. The computer program product of claim 15, wherein:
said inferences are made by operation of a forward chaining rules engine, and by implementing a RETE algorithm.

18. In association with a network that has a resource set comprising multiple resources, wherein a set of rules is applied to arrange respective resources into a structure comprising an object graph, and changes are disposed to occur over time to one or more resources of the resource set, apparatus comprising:
means for providing an initial object graph to a system database, wherein the initial object graph is either generated by applying the set of rules to respective resources included in the resource set at a specified time, or else is provided at a specified time by revising a previous object graph, selectively, the resource set at the specified time comprising an initial resource set;
means for providing a working memory with a copy of the initial object graph, wherein the working memory is maintained in separation from the system database;
means for discovering a changed fact that is associated with one of the resources of the initial resource set;
means responsive to discovering the changed fact, for determining one or more modifications that are required by the changed fact to be made to the initial object graph;
means responsive to determining the one or more modifications required by the changed fact, for revising the initial object graph in the working memory to produce a revised object graph that includes each of the required modifications; and
means responsive to said revision of the initial object graph in the working memory, for making the same revision to the initial object graph in the system database, to provide the revised object graph therein.

19. The apparatus of claim 18, wherein:
said required modifications are the only revisions made to the initial object graph in order to produce the revised object graph, and the revised object graph is otherwise the same as the initial object graph.

20. The apparatus of claim 18, wherein:
said one or more modifications are determined from inferences which are made by applying one or more rules from the set of rules to the changed fact.

\* \* \* \* \*